(12) United States Patent
Zhu et al.

(10) Patent No.: US 11,519,147 B2
(45) Date of Patent: Dec. 6, 2022

(54) LOW-ENERGY COASTAL BEACH RESTORATION METHOD

(71) Applicant: THIRD INSTITUTE OF OCEANOGRAPHY, MINISTRY, Xiamen (CN)

(72) Inventors: Jun Zhu, Xiamen (CN); Feng Cai, Xiamen (CN); Hongshuai Qi, Xiamen (CN); Gang Lei, Xiamen (CN); Jianhui Liu, Xiamen (CN); Jinhai Zheng, Xiamen (CN); Jixiang Zheng, Xiamen (CN); Chi Zhang, Xiamen (CN); Huimei Cao, Xiamen (CN)

(*) Notice: Subject to any disclaimer, the term of this patent is extended or adjusted under 35 U.S.C. 154(b) by 0 days.

(21) Appl. No.: 16/951,177

(22) Filed: Nov. 18, 2020

(65) Prior Publication Data
US 2021/0395968 A1     Dec. 23, 2021

(51) Int. Cl.
*E02B 3/04*     (2006.01)
*E02B 3/02*     (2006.01)

(52) U.S. Cl.
CPC . *E02B 3/04* (2013.01); *E02B 3/02* (2013.01)

(58) Field of Classification Search
CPC combination set(s) only.
See application file for complete search history.

(56) References Cited

U.S. PATENT DOCUMENTS 2,158,046 A * 5/1939 Prendergast ............ E02B 3/121
                                                      405/21
4,669,913 A * 6/1987 Temple ..................... E02B 3/04
                                                      405/15
4,729,691 A * 3/1988 Sample ..................... E02B 3/06
                                                      405/21
(Continued)

FOREIGN PATENT DOCUMENTS

CN     101731116 A     6/2010
CN     105824993 A     8/2016
(Continued)

OTHER PUBLICATIONS

Office Action of CN Application 202010561806.3 dated Mar. 10, 2021.
(Continued)

*Primary Examiner* — Kyle Armstrong

(57) ABSTRACT

The present invention provides a low-energy coastal beach restoration method, comprising: constructing a convex beach berm, determining an aspect ratio of the beach berm edge, determining a beach face slope, performing sand replenishment, determining the dredging zone and dredging depth, and determining the steps of building a sediment groin. The present invention utilizes the feature of the convergence effect of the wave energy on the headland, artificially constructs a convex headland shaped beach berm, and determines the required beach face range and slope according to the convex beach berm edge. During beach restoration, dredging around the beach face, while reducing mud sources and increasing the nearshore water depth, it also builds a convex nearshore terrain, which effectively increases the wave energy at the restoration site and improves the coast muddy situation of low-energy coasts.

4 Claims, 2 Drawing Sheets

(56) References Cited

U.S. PATENT DOCUMENTS

Figure 1:
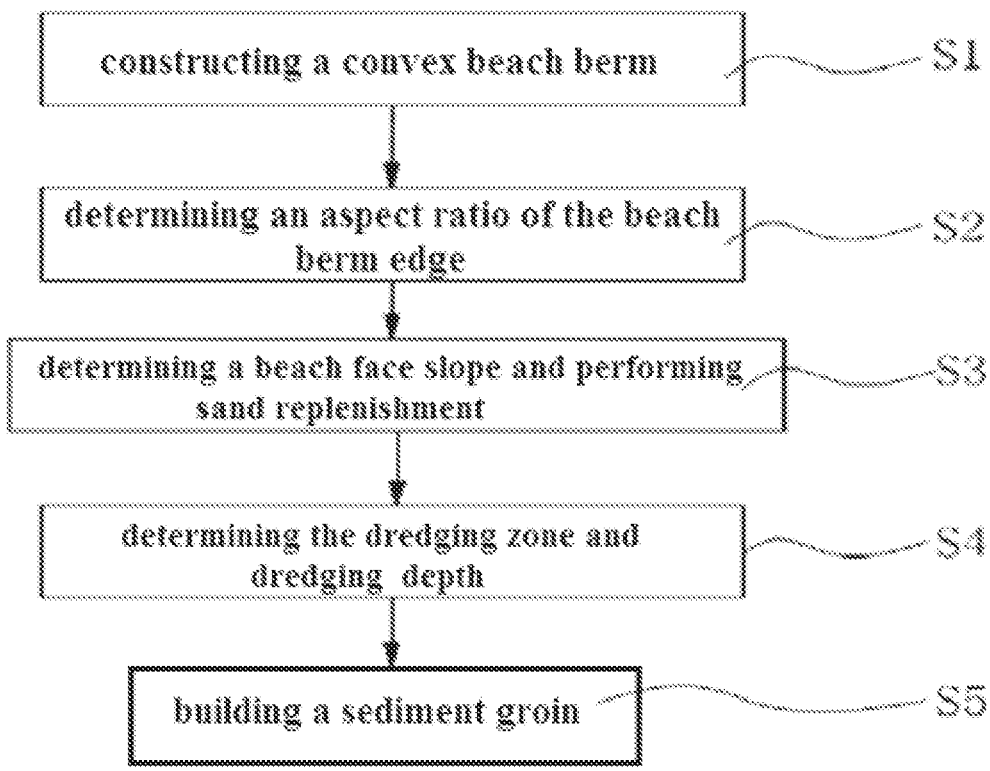

| | | | | |
|---|---|---|---|---|
| 4,759,664 | A * | 7/1988 | Deal .................. | E02F 9/062 |
| | | | | 405/258.1 |
| 5,428,908 | A * | 7/1995 | Kerfoot ................ | E02F 3/925 |
| | | | | 37/318 |
| 5,720,573 | A * | 2/1998 | Benedict ............... | E02B 3/04 |
| | | | | 256/12.5 |
| 5,895,174 | A * | 4/1999 | Beaver ................. | E02B 3/04 |
| | | | | 405/30 |
| 2007/0036611 | A1 * | 2/2007 | Patterson .............. | E02B 3/04 |
| | | | | 405/15 |

FOREIGN PATENT DOCUMENTS

| | | |
|---|---|---|
| CN | 108104054 A | 6/2018 |
| CN | 109577272 A | 4/2019 |

OTHER PUBLICATIONS

Office Action of CN Application 202010561806.3 dated Jan. 7, 2021.
Office Action of CN Application 202010561806.3 dated Jun. 22, 2021.
Notice of Allowance and Fee Due of CN Application 202010561806.3 dated Sep. 22, 2021.
Chinese Beach Nourishment Manual 2015. Feng Cai.

* cited by examiner

LOW-ENERGY COASTAL BEACH RESTORATION METHOD

CROSS REFERENCE TO RELATED APPLICATION

This Application claims priority to and the benefit of Chinese Patent Application Number CN2020105618063 titled "LOW-ENERGY COASTAL BEACH RESTORATION METHOD" and filed on Jun. 18, 2020, the disclosure of which is incorporated herein by reference in its entirety for all purposes.

FIELD

The present invention relates to the technical field of coastal restoration, in particular to a low-energy coastal beach restoration method

BACKGROUND

The beach is one of the most valuable areas in the coastal zone and a valuable tourist resource in the coastal area. A total of 18,000 kilometers of coastline along the coast of China, there are some coasts with small perennial wave heights, these coasts are called low-energy coasts. On low-energy coasts, beach resources are often scarce. Due to poor beach activity in low-energy environments, mud particles are easy to deposit and the sand-silt boundary is high, resulting in serious beach muddy, so it is extremely difficult to maintain artificial beaches on low-energy coasts. The fundamental reason for the difficulty of maintaining low-energy beaches lies in the low wave energy.

At present, beach restoration in China is often through the construction of "Static Ria Coast". The beach shapes are mostly concave structures. This design is conducive to the stability of the beach. For low-energy beaches, the beaches are usually stable but muddy beaches are often more serious. The muddy beaches seriously reduce the quality of the beach. The existing technology of "Static Ria Coast" maintenance methods can hardly alleviate the muddy beaches of low-energy coastal phenomenon.

SUMMARY

The purpose of the present invention is to provide a low-energy coastal beach restoration method to solve the serious technical problem of sand mudification on the low-energy coastal in the existing beach restoration technology.

The purpose of the present invention is to provide a low-energy coastal beach restoration method to solve the serious technical problem of sand mudification on the low-energy coastal in the existing beach restoration technology.

In order to achieve the above objective, the technical solution of the present invention provides a low-energy coastal beach restoration method, including the following steps: constructing a convex beach berm outer edge line, comprising determining a trend direction and an aspect ratio of the beach berm outer edge line to be restored according to a shape and a direction of an original coastline and a main wave direction of an adjacent sea area; determining a beach face slope and performing sand replenishment, comprising determining a beach face and the beach face slope outside the beach berm outer edge line, determining a sand replenishment area based on the beach face and beach face slope, and performing sand replenishment.

Further, in the step of constructing a convex beach berm outer edge line, a line connecting two end points of the beach berm outer edge line is perpendicular to the main wave direction, and an angle between the normal direction of the beach berm outer edge line and the main wave direction is less than 10°.

Further, in the step of constructing the convex beach berm outer edge line, the aspect ratio of the beach berm outer edge line is a/b, wherein a is a difference value between the maximum beach berm width and the minimum beach berm width, and b is a distance between two ends of a repaired sandy shoreline, and a/b is in the range of 0.05 to 0.1.

Further, in the step of determining the beach face slope and performing sand replenishment, the beach face slope is in the range of 1:50 to 1:200.

Further, in the step of determining the beach face slope and performing sand replenishment, the slope of the profile in the middle of the beach is the smallest, and the closer to both sides of the beach face, the slope gradually increases.

Further, it further comprises the following steps: determining a dredging zone and a dredging depth comprising dredging outside of a sand replenishment area and the outer edge of the beach face, combining a thickness of a silt layer and an original water depth to determine the dredging depth, and a near-shore isobath after dredging being a convex structure.

The beneficial effects of the low-energy coastal beach restoration method provided by the present invention are: (1) By using the characteristics of the convergence gathering of the wavy headland, a protruding headland-shaped beach berm outer edge line is artificially constructed, and the required beach surface range and beach slope are determined according to the convex beach berm outer edge line and sand replenishment is also made, thus constructing a convex nearshore terrain. This technology can effectively increase the wave energy at the restoration location, and has the effect of converging the wave energy, thereby improving the muddy situation of the beach on the low-energy coast; (2) During beach restoration, dredging around the beach surface increases the water depth near the shore. The increase in water depth can reduce the energy dissipation caused by the friction at the bottom of the wave, and can also reduce the mud source to a certain extent. It also helps to reduce the muddy beaches, and builds a convex shape of the nearshore terrain, which is conducive to wave refraction and guides more wave energy to converge on the beach surface, thereby improving the muddy situation of low-energy coasts; (3) A sediment groin is set up at outside of the sand replenishment area. The inclined sand groin not only helps to maximize the convergence effect of wave energy, but also ensures the stability of the beach and avoids the spread of the beach to both sides.

Further, in the step of determining the dredging zone and the dredging depth, a central convex area of the dredging zone is defined within 200 m to 500 m seaward from an outer boundary line of the sand replenishing area, and both sides of the dredging zone are defined within 100 m to 300 m seaward from the boundary line of the sand replenishing area.

Further, it further comprises the following steps: building a sediment groin (i.e. sediment barrier) on both sides of the sand replenishment area.

Further, two sediment groins on both sides are inclined, and an angle between the sediment groin and the shoreline is in the range of 50° to 80°.

Further, an elevation of the sediment groin gradually decreases from a side close to the shoreline toward sea, and the elevation of the sediment groin is 0.5 m to 1.0 m higher than an elevation of the beach profile.

Further areas of applicability will become apparent from the description provided herein. It should be understood that the description and specific examples are intended for purposes of illustration only and are not intended to limit the scope of the present disclosure.

For purposes of summarizing the disclosure, certain aspects, advantages, and novel features of the disclosure have been described herein. It is to be understood that not necessarily all such advantages may be achieved in accordance with any one embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

DRAWINGS

Figure 2:
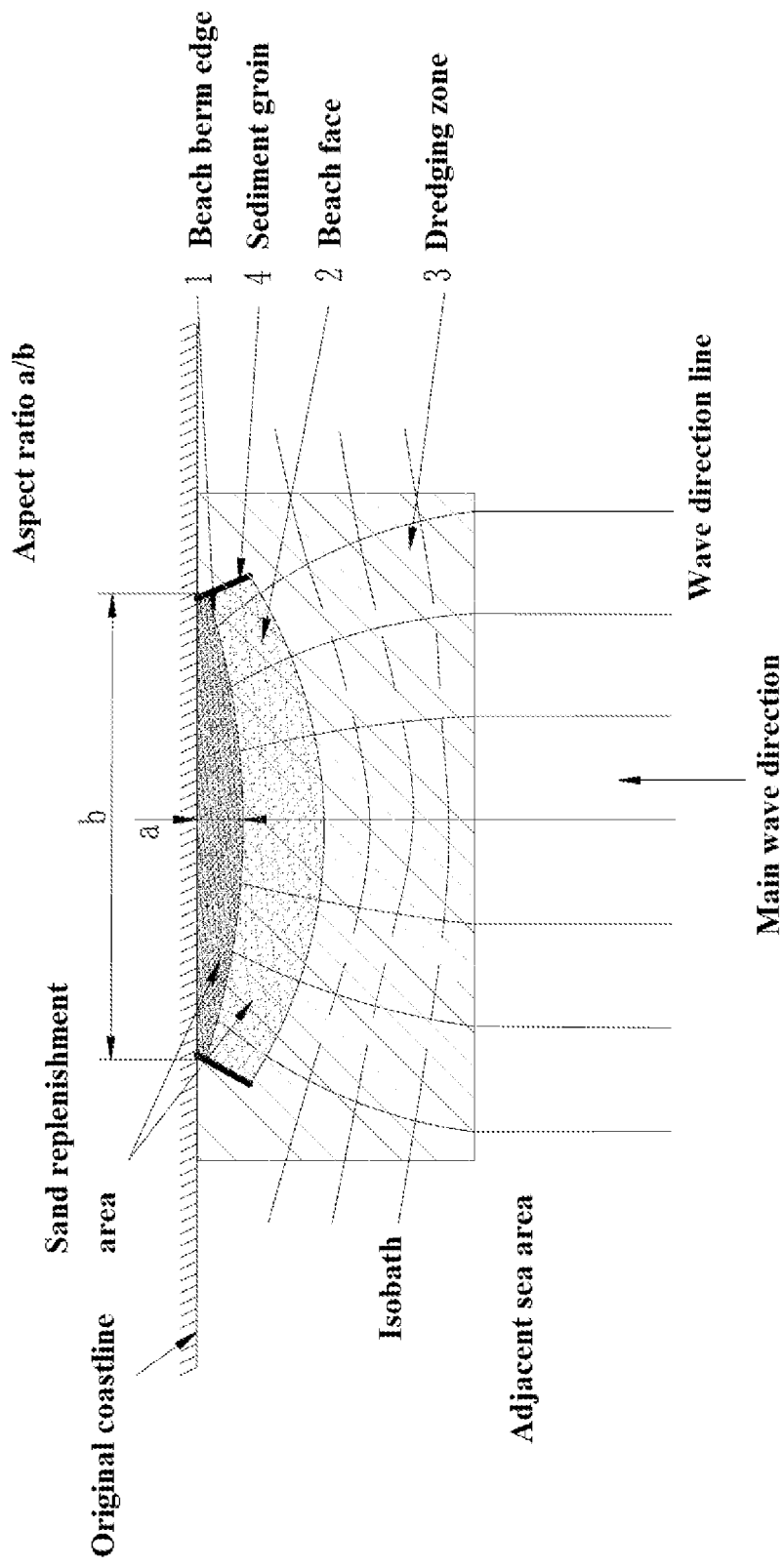

In order that the disclosure may be well understood, there will now be described various forms thereof, given by way of example, reference being made to the accompanying drawings in which:

FIG. 1 illustrates a schematic flowchart of the low-energy coastal beach restoration method according to an embodiment of the present invention; and FIG. 2 illustrates a schematic diagram of the low-energy coastal beach structure after construction of the low-energy coastal beach restoration method provided by an embodiment of the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The technical solutions of the present invention will be clearly and completely described below in conjunction with the accompanying drawings. Obviously, the described embodiments are part of the embodiments of the present invention, rather than all of the embodiments. Based on the embodiments of the present invention, all other embodiments obtained by those ordinary skill in the art without creative work shall fall within the protection scope of the present invention.

In the description of the present invention, it should be noted that the terms "center", "upper", "lower", "left", "right", "vertical", "horizontal", "inner", "outer", etc. The indicated orientation or positional relationship is based on the orientation or positional relationship shown in the drawings, and is only for the convenience of describing the present invention and simplifying the description, rather than indicating or implying that the pointed device or element must have a specific orientation or a specific orientation. The structure and operation cannot therefore be understood as a limitation of the present invention. In addition, the terms "first", "second", and "third" are only used for descriptive purposes, and cannot be understood as indicating or implying relative importance.

In the description of the present invention, it should be noted that the terms "installation", "connected" and "connection" should be understood in a broad sense, unless otherwise clearly specified and limited. For example, they may be fixed or detachable connection or integral connection; or they may be a mechanical connection or an electrical connection; or they may be direct connection or indirect connection through an intermediate medium, or they may be an internal communication between two components. For those ordinary skill in the art, the specific meanings of the above-mentioned terms in the present invention can be understood in specific situations.

In addition, the technical features involved in the different embodiments of the present invention described below can be combined with each other as long as there is no conflict therebetween.

Please refer to FIG. 1 and FIG. 2 together, the low-energy coastal beach restoration method provided by the present invention will now be described. Reference numerals are designated as follows: 1. beach berm edge; 2. beach face; 3. dredging zone; 4. sediment groin.

The low-energy coastal beach restoration method includes the following steps:

Step 1: A convex beach berm edge 1 is constructed, comprising determining a trend direction and an aspect ratio of the beach berm edge 1 to be restored according to a shape and a direction of an original coastline and a main wave direction of an adjacent sea area. The direction of the beach berm edge 1 is a convex structure that protrudes toward the side away from the shoreline. The line connecting two end points of the beach berm edge 1 is perpendicular to the main wave direction, and an angle between the normal direction of the beach berm edge 1 and the main wave direction is less than 10°.

Step 2: The aspect ratio of the beach berm edge 1 is determined, the aspect ratio of the beach berm edge 1 is a/b, wherein a is a difference value between the maximum beach berm width and the minimum beach berm width, and b is a distance between two ends of a restored sandy shoreline, and a/b is in the range of 0.05 to 0.1. Among them, the maximum beach berm width, the minimum beach berm width, and the distance between the two ends of the sandy shoreline adopt the same distance unit, that is Meter.

Step 3: The beach face slope is determined and sand replenishment is performed. In order to increase the effective wave height at the front of beach face 2 during beach restoration in weak-power sea areas or low-energy coasts, the slope of beach 2 needs to be greatly reduced, and the beach face slope 2 needs to be controlled between 1:50 and 1:200. Among them, the slope of the profile in the middle of the beach is the smallest, and the closer to both sides of the beach face, the slope gradually increases to ensure that the beach has a gradual smooth shape on both sides of the central convex. After determining the slope of the beach face 2, the sand replenishment zone based on the current beach and coastline conditions is determined, and the sand is replenished in the sand replenishment zone, thus forming a convex beach face 2.

Step 4: A dredging zone 3 and a dredging depth is determined, comprising dredging a sand replenishment area and the outer edge of the beach face 2, combining a thickness of a silt layer and an original water depth to determine the dredging depth, and a near-shore isobath after dredging being a convex structure. Among them, during dredging, not only does the silt in the sand replenishment area have to be dredged, but also the silt outside of the sand replenishment area has to be removed to increase the water depth near the shore and reduce the energy dissipation caused by wave bottom friction.

Among them, a central convex area of the dredging zone 3 is defined within 200 m to 500 m seaward from an outer boundary line of the sand replenishing area, and both sides of the dredging zone 3 are defined within 100 m to 300 m seaward from the boundary line of the sand replenishing area. Thus, a convex nearshore isobath is formed. The specific dredging depth should be determined by combining the thickness of the silt layer and the original water depth. This technology is conducive to wave refraction and guides more wave energy to converge on the beach face 2.

Step 5: A sediment groin 4 is built on both sides of the sand replenishment area. The sediment groin 4 is used to increase the convergence effect of waves. Among them, the sediment groin 4 on both sides adopts the outer-eight structure and is arranged obliquely to the shoreline. Preferably, the angle between the sediment groin 4 and the shoreline is 50° to 80°.

Preferably, an elevation of the sediment groin 4 gradually decreases from a side close to the shoreline toward sea, and the elevation of the sediment groin 4 is 0.5 m to 1.0 m higher than an elevation of the beach profile. That is, the height of the sediment groin gradually decreases from the shore to the sea, and the height of the sediment groin 4 is 0.5 to 1.0 m higher than the profile height of the beach face 2, which can mainly block the sand in the sand replenishment area, avoid the spread of the beach towards both sides, and increase the effect of wave convergence.

Through the low-energy coastal beach restoration method provided in the embodiment of the present invention, a convex headland-shaped beach berm edge 1 can be constructed by artificial means in a low-energy environment where beach activities are poor, mud particles are easy to deposit, and the boundary between sand and mud is high; and according to the convex beach berm edge 1, the required range and slope of the beach face 2 are determined and sand is supplemented, so as to construct a convex nearshore terrain, which can improve the muddy condition of the low-energy coast, effectively improve the waves at the restoration location, and has the effect of converging wave energy.

Dredging around beach face 2 increases the water depth near the shore. The increase in water depth can reduce the energy dissipation caused by wave bottom friction, and can also reduce the mud source to a certain extent, and is helpful to reduce the muddy beaches, and build a convex-shaped nearshore terrain, which is conducive to wave refraction and guides more wave energy to converge on beach face 2.

By setting the sediment groin 4, the inclined sediment groin 4 not only helps to maximize the convergence effect of wave energy, but also ensures the stability of the beach and avoids the spread of the beach to both sides.

In other embodiments of the present invention, the line connecting the end points on both sides of the beach berm edge 1 may not be accurately perpendicular to the main wave direction due to processing errors; however, it needs to be as perpendicular as possible, and the angle between the normal direction of the beach berm edge 1 and the main wave direction can also be slightly greater than 10° depending on the terrain conditions.

For the slope of beach face 2, in traditional beach restoration, the slope of the construction profile is usually controlled between 1:5 and 1:10. The construction profile can be adjusted to a balanced profile under the action of wave dynamics, but at low-energy coast, in order to increase the effective wave height in front of beach face 2, the slope of beach face 2 needs to be greatly reduced. Therefore, the slope of beach face 2 is 1:50 to 1:200. According to actual conditions and specific needs, the slope of beach face 2 can also be greater than 1:200.

In other embodiments of the present invention, according to actual conditions and specific needs, the dredging zone 3 can also be expanded to 500 m beyond the outer boundary line of the sand replenishment area facing the overseas; both sides of the dredging zone 3 are defined within 300 m seaward from the boundary line of the sand replenishing area; there is no need to set the sediment groin 4, or the inclination angle of the sediment groin 4 is below 50° or above 80°. The elevation of the sediment groin 4 can also be set to different heights according to specific needs. There are no unique restrictions.

In other embodiments of the present invention, according to actual conditions and specific needs, if the amount of sand on the beach is sufficient, there is no need for more sand supplementation or separate sand supplementation operations. If the silt deposition is not serious, dredging may not be required, and there is no need to make a special dredging as to the dredging area 3. Among them, setting sand groins 4 on both sides of the restoration area is to increase the effect of wave aggregation, and other wave aggregation structures can also be set, and there is no unique specific limitation here.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A low-energy coastal beach restoration method comprising:
   (a) constructing a convex beach berm edge to increase incident wave energy, comprising determining an aspect ratio a/b of the beach berm edge to be restored according to an appearance and a trend direction of an original coastline and a main wave direction of an adjacent sea area; wherein a is a difference value between the maximum beach berm width and the minimum beach berm width, and b is a distance between two ends of a restored coastline, and a/b is in the range of 0.05 to 0.1;
   (b) determining a beach face slope outside the beach berm edge, thus determining a sand replenishment area and further performing sand replenishment, wherein the beach face slope is in the range of 1:50 to 1:200 and the slope of a profile in the middle of the beach is the smallest, and the closer to both sides of the beach, the slope gradually increases, so as to construct a nearshore terrain for converging wave energy; and
   (c) building a sediment groin on both sides of the sand replenishment area, wherein a line connecting two end points of the beach berm edge is nearly perpendicular to the main wave direction, and an angle between the normal direction of the beach berm edge and the main wave direction is less than 10°, and the groins on both sides are inclined.

2. The low-energy coastal beach restoration method according to 1, further comprising the step of dredging, the dredging comprising:
   (a) determining a dredging zone, wherein a central convex area of the dredging zone is defined within 200 m to 500 m seaward from an outer boundary line of the sand replenishing area, and both sides of the dredging zone are defined within 100 m to 300 m seaward from the boundary line of the sand replenishing area, and
   (b) determining a dredging depth of the dredging zone according to a thickness of a silt layer and an original water depth, wherein an isobath of the dredging zone after dredging is convex.

3. The low-energy coastal beach restoration method according to claim 1, wherein an angle between the sediment groin and the original coastline is in the range of 50° to 80°.

4. The low-energy coastal beach restoration method according to claim 3, wherein, an elevation of the sediment groin from a side close to the original coastline gradually decreases toward sea, and the elevation of the sediment groin is 0.5 m to 1.0 m higher than an elevation of the beach profile.

* * * * *